2 Sheets—Sheet 1.

J. B. MANGETT.
CULTIVATOR AND MARKER.

No. 184,398. Patented Nov. 14, 1876.

WITNESSES
C. H. Bates
B. H. Morse

INVENTOR
John B. Mangett

Gilmore Smith & Co.
ATTORNEYS

THE GRAPHIC CO. N.Y.

2 Sheets—Sheet 2.

J. B. MANGETT.
CULTIVATOR AND MARKER.

No. 184,398. Patented Nov. 14, 1876.

WITNESSES

INVENTOR
John B. Mangett
Gilmore Smith &Co.
ATTORNEYS

UNITED STATES PATENT OFFICE.

JOHN B. MANGETT, OF KIRBY, OHIO.

IMPROVEMENT IN CULTIVATORS AND MARKERS.

Specification forming part of Letters Patent No. 184,398, dated November 14, 1876; application filed August 19, 1876.

*To all whom it may concern:*

Be it known that I, JOHN B. MANGETT, of Kirby, in the county of Wyandot and State of Ohio, have invented a new and valuable Improvement in Cultivators and Markers; and I do hereby declare that the following is a full, clear, and exact description of the construction and operation of the same, reference being had to the annexed drawings, making a part of this specification, and to the letters and figures of reference marked thereon.

Figure 1:
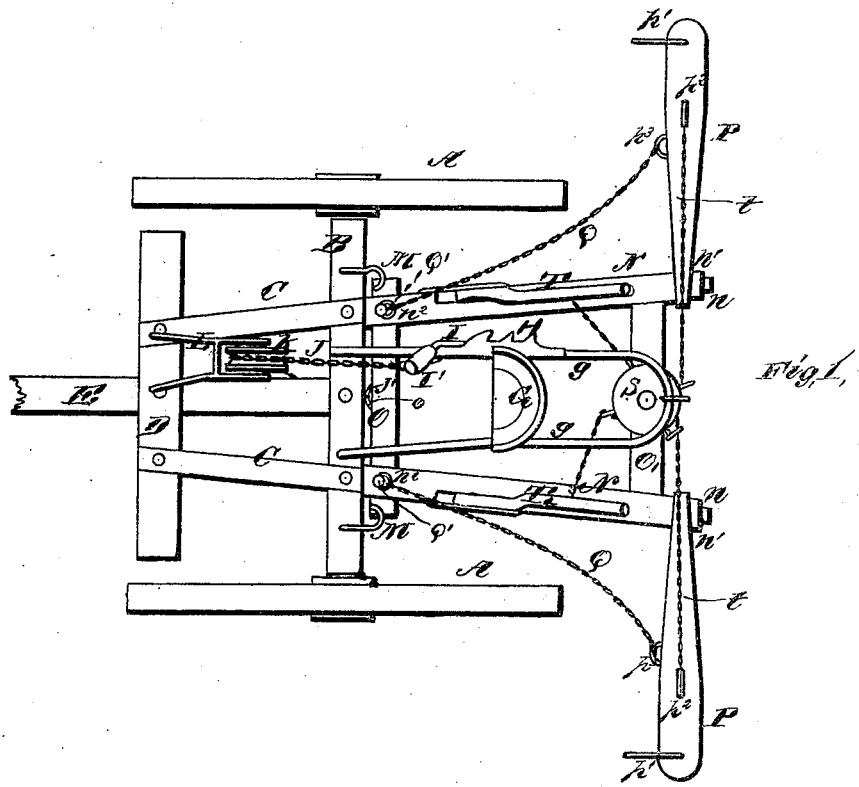
Figure 2:
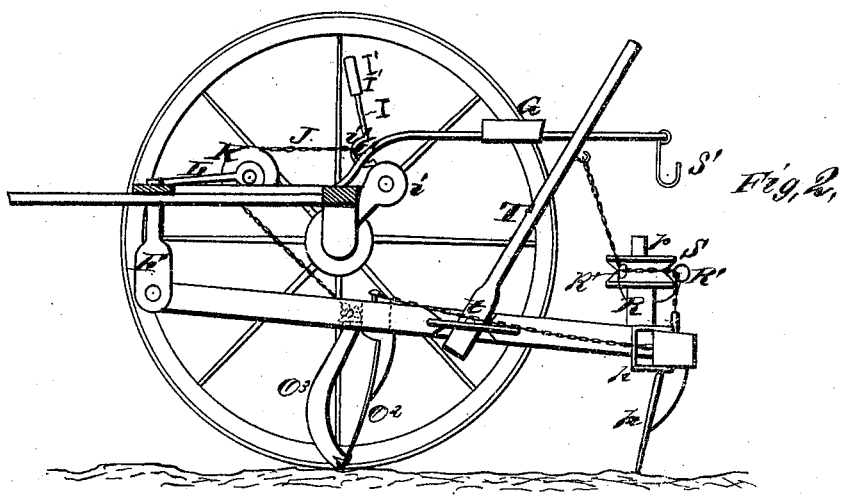
Figure 3:
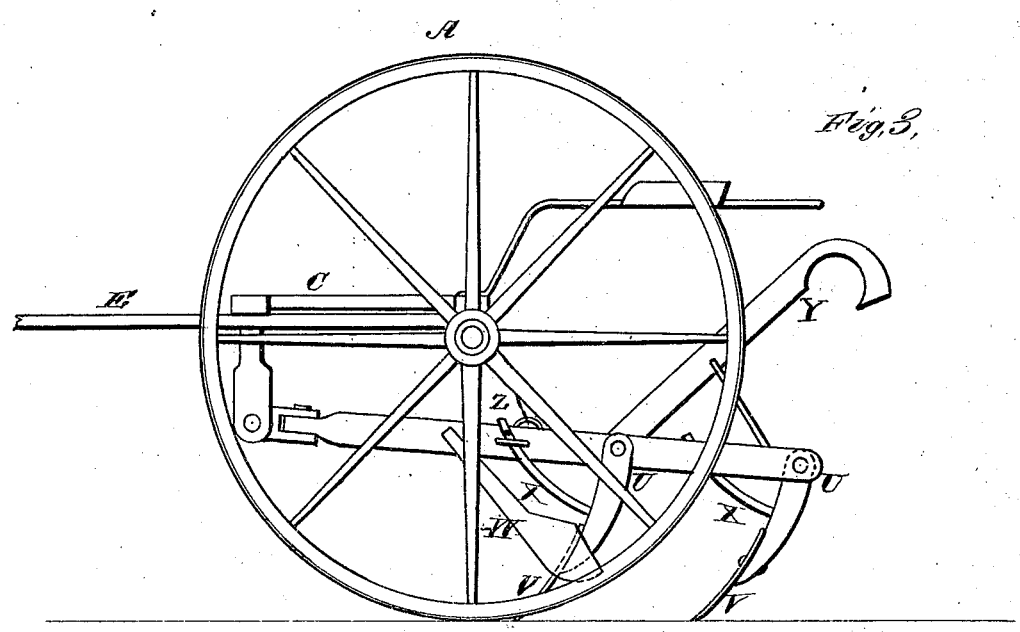

Figure 1 of the drawings is a representation of a plan view of my machine used as a marker, and Fig. 2 is a longitudinal vertical sectional view of the same. Fig. 3 is a side view of my machine used as a cultivator.

This invention relates to agricultural implements which are adapted to be converted at will into either cultivators or markers; and it consists in certain improvements therein, as will be hereinafter fully set forth.

In the accompanying drawings, A A designate the transporting-wheels of my apparatus, and B designates a double cranked or arched axle, of ordinary construction, on which said wheels revolve. C C are two short longitudinal bars rigidly attached by their rear ends to axle B, and by their forward ends to a long cross-bar, D. Bars C C D, with axle B, constitute the frame of the vehicle. E designates a draft-pole, which is rigidly secured to the middle of axle B and cross-bar D, on the under side of said axle and cross-bar. From the under side of cross-bar D, on each side of said draft-tongue, hangs a bracket or bifurcated standard, F. In said brackets or bifurcated standards are pivoted the front ends of the cultivator-beams or the marker-frame beams, as the case may be. G designates a driver's seat supported on curved rods $g$ $g$, the lower ends of which are embedded in, or rigidly attached to, axle B. To said axle is also rigidly attached a backwardly-curving notched plate or rack, H, which is adapted to catch and retain a rearwardly and forwardly vibrating adjusting lever or rod, I. Said lever or rod I is pivoted at its lower end to a bracket, $i$, which is rigidly attached to the rear of axle B. Rod or lever I is also provided with a suitable handle, I', at its upper end, and with a forward curve, $i^1$, at its middle, to which is attached a hook, $i^2$. Said hook catches into one of the links of a chain, J, which passes over a pulley, K, that is pivoted in a small frame, L, secured to cross-bar D and one of the side bars C. The rear ends of seat-supporting rods $g$ $g$ extend some distance behind seat G, and unite, forming a loop, or one rod may be made to take the place of two, said rod being bent into the form described. The upper end of notched band or rack H is secured to rod $g$ by means of a small sleeve forming part of said band, which envelopes said rod. Any other suitable means of attachment may be substituted therefor. To axle B are also secured rearwardly-extending inwardly-curved hooks M M, one on each side of said driver's seat G. The office of said hooks is to hold the markers or cultivators out of action when desired.

Figs. 1 and 2 show the above-described apparatus with the marking devices attached. Said devices consist of the following parts: N N are two longitudinal beams, connected by cross-bars O O', so as to form a marker-frame, and provided with rearwardly-extending journals $n$ $n$, on which are pivoted outwardly-extending vertically-vibrating marker-arms P P. Each of said marker-arms is provided on its under side, near its outer end, with a marker-point, $p$, above which is a loop or staple, $p^1$. Said marker-arm P has also, in each case, a small staple, $p^2$, on its top, and a similar staple, $p^3$, on its front. Said marker-arms are prevented from slipping off said small journals or pivots $n$ $n$ by suitable washers $n^1$ $n^1$. Q is a brace-chain, which connects the above-described staple $p^3$ with a stud or pin, $n^2$, on the top of marker-frame beam N. There are two of such staples, $p^3$, of such pins $n^2$, and of such brace-chains Q, so as to suitably brace both of the said marker-arms P P, and to prevent them from being injured by the strain caused by the resistance of the ground. Said chains are each made detachable by means of a hook, which catches into staple $p^3$, and a ring, Q', which slips over pin or stud $n^2$. When it is desired to keep said markers out of operation, said rings may be slipped off from said studs and caught upon hooks M M, which will hold the said markers or marker-points $p\ p$ above the surface of the ground.

The vertical adjustment of the entire marker-frame upon its pivots in brackets or standards F F is effected in the following manner, and by the following means: The lower end of chain J (already described) is provided with a hook, J', which is adapted to engage with an eye or staple, $o$, on the front cross-bar O. When, therefore, lever I is forced backward, the draft on chain J is transmitted to said marker-frame, raising the same; and when the backward pressure is withdrawn from said lever, the weight of said frame will draw it downward again. The degree of such vertical adjustment is determined by catching the said rod I into the notch or tooth of notched band or rack H, which corresponds to the height desired. To the under side of said forward cross-bar O a third marker-point, $O^2$, is attached, provided with a guide-cutter blade, $O^3$.

The marker-points $p\ p$ may be adjusted vertically, without affecting the arrangement or position of the parts last named, by the following means: On rear cross-bar $O^1$ I secure a vertical standard, R, which terminates at the top in a vertical journal, $r$, on which turns a horizontal grooved pulley, S. From said standard R arise four metal guide-loops, R', surrounding said grooved pulley. T T are levers, which are pivoted at their lower ends to longitudinal beams N N, and $t\ t$ are cords or chains, each of which extends from one of said levers N diagonally through two of said guide-loops R', nearly half around said grooved pulley S, and to a staple, $p^2$, on the upper side of the marker-arm P, which is diagonally opposite to said lever T, to which said cord or chain is attached. Said cords or chains $t\ t$ thus cross at the rear of said pulley S, and fit into the circumferential groove thereof. The result of this arrangement is that when levers T T are drawn forward, said marker-arms P P are raised upon their pivots, so that said marker-points $p\ p$ no longer touch the ground, and the device is out of operation. One of said points may be raised from the ground without affecting the position of the other, and both are within easy reach from the driver's seat G. The office of loose pulley S is to diminish the friction upon rods or cords $t\ t$. S' is a hook secured to seat-supporting rod or rods $g\ g$, and adapted to catch and hold cords or chains $t\ t$, so as to retain arms P P in an elevated position.

Various modifications of the above devices and combinations may be made without departing from the spirit of my invention. For instance, instead of a single pulley, S, I may use two such pulleys arranged on opposite sides of the rear cross-bar $O^1$, each of said pulleys being provided with a standard, R, and two guide-loops, R'; also, spring-catches or other detachable attachments may be substituted for hooks and rings in most of the cases where connections are made between chains and the various other parts of the apparatus.

Fig. 3 shows my invention adapted to use as a cultivator. U U designate cultivator-shovel beams, each of which is provided with shovels V V, a colter, W, a pivoted front bracket or clip, X, a handle, Y, and a chain, Z. Said chain serves to suspend the said cultivator beam and shovels from a hook on the main frame of the vehicle.

What I claim as new, and desire to secure by Letters Patent, is—

1. The combination of levers T T with chains or cords $t\ t$, pulley S, and marker-arms P P, substantially as and for the purpose set forth.

2. The combination of an adjusting-lever and vertically-adjusting marker-arm with a diagonally-operating chain or cord, and guide eyes or loops R' R', substantially as and for the purpose set forth.

In testimony that I claim the above I have hereunto subscribed my name in the presence of two witnesses.

JOHN BAPTIST MANGETT.

Witnesses:
  JOHN B. BREMYER,
  MATHIAS STRASER.